UNITED STATES PATENT OFFICE.

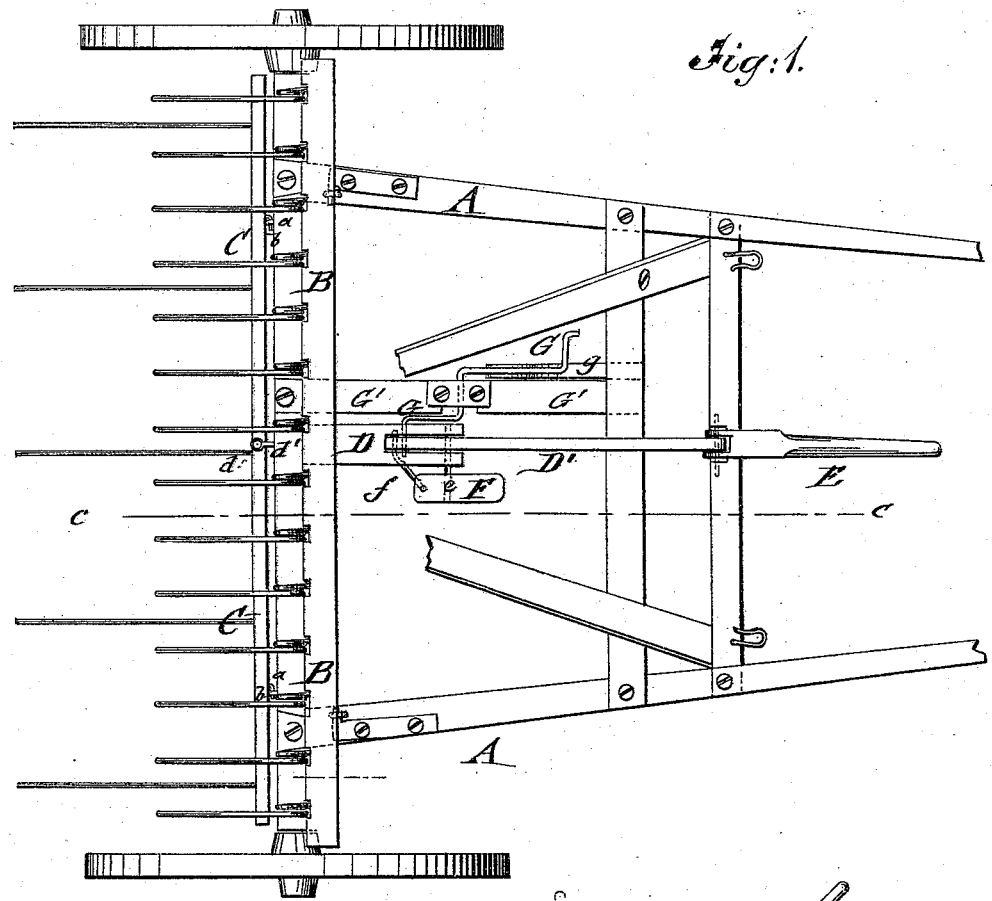

DANIEL D. DUNN, OF GREENWICH, CONNECTICUT.

IMPROVEMENT IN HORSE HAY-RAKES.

Specification forming part of Letters Patent No. 174,214, dated February 29, 1876; application filed September 17, 1875.

*To all whom it may concern:*

Be it known that I, DANIEL D. DUNN, of Greenwich, in the county of Fairfield and State of Connecticut, have invented a new and Improved Hay-Rake, of which the following is a specification:

In the accompanying drawing, Figure 1 represents a top view, and Fig. 2 a vertical longitudinal section on the line c c, Fig. 1, of my improved hay-rake.

Similar letters of reference indicate corresponding parts.

My invention relates to improvements in horse hay-rakes, by which the different operations of the rake-head-governing parts may be accomplished in a simpler, more perfect, and convenient manner.

The invention consists, first, in applying the swinging rake-head in front of the supporting-axle; secondly, in attaching the clearer-bar; thirdly, in combining the rake-head-operating lever-rod and back piece with a treadle, in such a manner that the horizontal position of the same is secured during its motion; and, lastly, in the combination of the rake-head-operating lever-rod with a fulcrumed foot-lever, for securing the rake in raised or lowered position.

In the drawing, A represents the rake-supporting wheel-frame, on which the different parts of the rake are arranged. The rake-head B is hinged to frame A in front of the axle, by which not only the lever-connection is shortened, so as to allow the easier operation of the same, but mainly the position of the ends of the rake-teeth in line with the tread of the wheel-frame produced, by which a more careful raking and a greater facility to overcome obstructions are obtained. The clearer-bar C is hung at both ends by pivot-hooks a to staples b of the axle, and locked in horizontal position by a coupling-pin, d, passing through a center staple or eye, d', and a perforation of the clearer-bar.

By taking out the coupling-pin the clearer-bar may be readily detached and quickly replaced, as required.

The forked back piece D of the rake-head B is connected, by a pivoted lever-rod, D', with the upright main lever E, that is pivoted to the front cross-bar of the supporting-frame.

The lever-rod D' is curved at the under side of its rear end back of its pivot-pin e, and lined with band-iron, to make it more durable. A treadle, F, is loosely pivoted to the pivot-pin e, sidewise of back piece D, and connected, by a fixed brace-rod, f, attached to the rear part of treadle, with the rear end of lever-rod D'. The brace-rod f secures the horizontal position of the treadle F in its upward and downward movement, in conjunction with the lever-rod, and produces thereby the convenient rest for the foot, to assist the ready throwing in and out of action of the rake. A lever, G, is fulcrumed to a longitudinal piece, G', attached to the supporting-frame A, near the back piece D, at the side opposite the treadle. Lever G is bent at both ends—at the front end to form a rest or treadle for the foot of the driver, and at the rear end to extend below the curved rear part of lever-rod D'. A strong band-spring, g, supports the front part of lever G when depressed, for the purpose of binding firmly on the rear part of lever-rod D', and securing thereby the rake head and teeth in rigid position for effective raking.

When the rake is thrown up, the lever G binds on the lever-rod D' in front of the back piece, and retains the rake-head securely in this position until dropped again for work.

The simple yet effective construction of the lever admits the retention of the rake in raised or lowered position by the foot, and allows, in connection with the treadle, the ready and convenient control of the rake by the feet, without the use of the hands, if desired.

Having thus described my invention, I claim as new and desire to secure by Letters Patent—

1. The clearer-bar C, secured to axle by a median coupling-pin, d, and a hook-and-eye catch on each side of said coupling, as and for the purpose described.

2. The combination of arm D, rod D', lever E, and treadles F G, as and for the purpose specified.

DANIEL D. DUNN.

Witnesses:
HERBERT G. HENDERSON,
H. S. BANKS.